United States Patent
Fryer et al.

(10) Patent No.: US 10,009,654 B2
(45) Date of Patent: Jun. 26, 2018

(54) MEDIA INTERFACE DEVICE

(71) Applicant: AT&T INTELLECTUAL PROPERTY I, L.P., Atlanta, GA (US)

(72) Inventors: Todd Andrew Fryer, Liberty, MO (US); Nicholas Nicas, Blue Springs, MO (US); Douglas Medina, Grain Valley, MO (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days. days.

(21) Appl. No.: 14/969,745

(22) Filed: Dec. 15, 2015

(65) Prior Publication Data

US 2017/0171618 A1    Jun. 15, 2017

(51) Int. Cl.
| | |
|---|---|
| H04N 7/173 | (2011.01) |
| H04N 21/462 | (2011.01) |
| H04N 7/16 | (2011.01) |
| H04N 21/414 | (2011.01) |
| H04N 21/4143 | (2011.01) |
| H04N 21/426 | (2011.01) |
| H04N 21/4402 | (2011.01) |
| H04N 21/61 | (2011.01) |

(52) U.S. Cl.
CPC ......... *H04N 21/4622* (2013.01); *H04N 7/161* (2013.01); *H04N 7/17363* (2013.01); *H04N 21/4143* (2013.01); *H04N 21/41407* (2013.01); *H04N 21/4263* (2013.01); *H04N 21/440218* (2013.01); *H04N 21/6118* (2013.01); *H04N 21/6125* (2013.01); *H04N 21/6131* (2013.01); *H04N 21/6143* (2013.01)

(58) Field of Classification Search
CPC .............. H04N 21/462; H04N 21/414; H04N 21/4143; H04N 21/426; H04N 21/4402; H04N 21/61

See application file for complete search history.

(56) References Cited

U.S. PATENT DOCUMENTS

| | | |
|---|---|---|
| 8,015,310 B2 | 9/2011 | Gahm et al. |
| 8,069,260 B2 | 11/2011 | Speicher et al. |
| 8,161,510 B2 | 4/2012 | Krakora et al. |

(Continued)

OTHER PUBLICATIONS

"Juice MultiHybrid," Antik Technology, surmanek.antiktech.dev. antik.sk, Oct. 7, 2013 https://web.archive.org/web/20131007163717/http://surmanek.antiktech.dev.antik.sk/iptvproducts/juicemultihybrid, 2 pp.

(Continued)

*Primary Examiner* — John Schnurr
(74) *Attorney, Agent, or Firm* — Toler Law Group, PC

(57) ABSTRACT

An apparatus includes a plurality of packetizers, a buffer, and an interface. The plurality of packetizers includes a first packetizer and a second packetizer. Each of the plurality of packetizers is configured to receive media content from a corresponding media source. The buffer is coupled to the plurality of packetizers and is configured to concurrently receive first content from the first packetizers and second content from the second packetizers. The interface is configured to provide the first content from the buffer to a display device and to provide the second content from the buffer to the display device responsive to a media selection request received from the display device.

20 Claims, 6 Drawing Sheets

(56) References Cited

U.S. PATENT DOCUMENTS

| | | |
|---|---|---|
| 8,218,654 B2 | 7/2012 | Cheng et al. |
| 8,255,555 B2 | 8/2012 | Takemura et al. |
| 8,331,561 B2 | 12/2012 | Domingo et al. |
| 8,634,390 B2 | 1/2014 | Ramakrishnan et al. |
| 9,161,082 B2 | 10/2015 | Ou et al. |
| 2003/0026280 A1* | 2/2003 | Mansouri ............. H04N 21/226 370/429 |
| 2004/0181813 A1 | 9/2004 | Ota et al. |
| 2005/0268324 A1* | 12/2005 | An .................... H04L 29/06027 725/152 |
| 2006/0075428 A1 | 4/2006 | Farmer et al. |
| 2011/0173667 A1* | 7/2011 | Watson ................ H04N 5/4401 725/56 |
| 2014/0165121 A1* | 6/2014 | Dang ................. H04L 65/4084 725/109 |
| 2015/0082337 A1* | 3/2015 | Mamidwar ...... H04N 21/23895 725/31 |
| 2015/0163544 A1 | 6/2015 | Rivera |

OTHER PUBLICATIONS

Drawbaugh, Ben, "TiVo Premiere vs Windows 7 Media Center", Engadget, engadget.com, Aug. 5, 2010, http://www.engadget.com/2010/08/05/tivopremierevswindows-7-media-center/, 3 pp.

\* cited by examiner

MEDIA INTERFACE DEVICE

FIELD OF THE DISCLOSURE

The present disclosure is generally related to a media interface device.

BACKGROUND

Multimedia devices, such as "smart" televisions, tablet computers, mobile phones, set top boxes, etc. may receive multimedia content that originates from a variety of providers. The variety of providers may transmit content using a variety of transmission technologies (e.g., satellite digital video broadcasting, internet, cable television, cellular communication, etc.). A multimedia device may not be configured to receive content transmitted using each of the variety of techniques. For example, the multimedia device may be able to receive and process Internet protocol formatted content, but may be unable to receive and process satellite digital video broadcasting formatted content.

DETAILED DESCRIPTION

Figure 1:
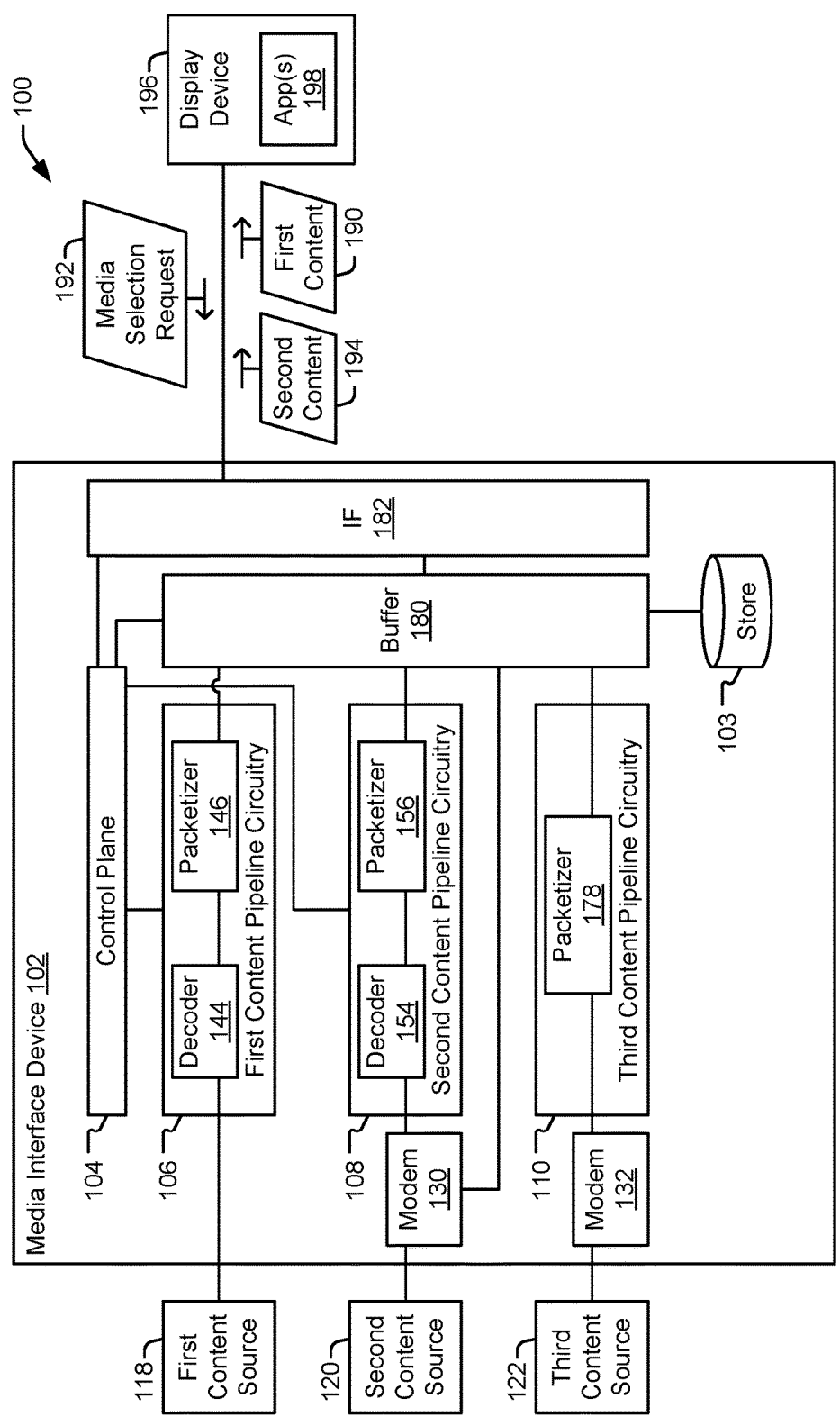
FIG. 1 is a block diagram illustrating a particular example of a media interface device.

A media interface device may function as a "universal gateway" that enables access to media content available from various types of content sources. For example, the media interface device may include a plurality of receivers configured to receive media content from corresponding media sources. Each media source (e.g., content source) may be associated with a corresponding communication technology (e.g., 8-level vestigial sideband modulation, satellite digital video broadcasting, internet protocol television, cable television, cellular communication, online streaming, etc.). The media interface device may be configured to convert data received from multiple media sources into a common format (e.g., an internet protocol format). In some implementations, the media interface device may be a standalone device that is configured to communicate with a display device (e.g., a television, a mobile phone, a laptop computer, a tablet computer, or another device capable of displaying media content). In other implementations, the media interface device may be embedded in a device (e.g., (e.g., a television, a mobile phone, a laptop computer, a tablet computer, or another device capable of displaying media content). The media interface device may provide first content corresponding to a first media source or second content corresponding to a second media source to the display device. In some implementations, the media interface device may communicate with multiple display devices.

The media interface device may be configured enable a user of a display device to select content from multiple content sources using a single remote control device (associated with the display device) rather than separate remote control devices for each content source. Because the display device may directly interact with the media interface device, multiple set top boxes (each set top box corresponding to a different content source) may not be needed to request and view media content at the display device from multiple content source. Additionally, since the media interface device may receive commands from and provide content to more than one display device, a separate set top box is not needed for each display device to receive content from a variety of content sources that use a variety of technologies to transmit content.

In some implementations, the media interface device may receive a first media selection command from the display device. The first media selection command may indicate content to be provided from the media interface device to the display device, such as first content corresponding to a first content source. In response to the first media selection command, the media interface device may activate a receiver corresponding to the first content source and may send the first content to the display device using the common format (e.g., the internet protocol format). While providing the first content to the display device, the media interface device may receive a second media selection command from the display device. The second media selection command may indicate second content corresponding to a second content source. In response to the second media selection command, the media interface device may activate a second receiver corresponding to the second content source and may send the second content to the display device using the common format (e.g., the internet protocol format). When the media interface device switches from providing the first content from the first content source to providing the second content from the second content source, there may be a delay in a content stream received at the display device due to acquisition (or re-acquisition) of the second content from the second content source.

The present disclosure describes a media interface device configured to buffer content from multiple content sources to reduce or eliminate a delay during a content switching operation. For example, the media interface device may be configured to concurrently receive media content from multiple content sources, such as first media content from a first content source and second media content from a second content source. Each content source of the multiple media sources may be associated with a corresponding communication technology (e.g., 8-level vestigial sideband modulation, satellite digital video broadcasting, internet protocol television, cable television, cellular communication, online streaming, etc.). The media interface device may convert the received media content from the multiple content sources into the same format (e.g., a common format), such as an IP packet format. For example, the media interface device may include a first packetizer configured to output the first media content as first packetized content having the IP packet format and may include a second packetizer configured to output the second media content as second packetized content having the IP packet format. The first packetized content and the second packetized content may be stored in a buffer, such as a first in-first out (FIFO).

In some implementations, the media interface device may provide the first packetized content, via an interface of the media interface device, to a display device (e.g., a television, a mobile phone, a laptop computer, a tablet computer, or another device capable of displaying media content). While providing the first packetized content from the buffer to the display device, the media interface device may receive a media selection request from the display device to provide the second media content associated with the second content source. In response to the media selection request, the media interface device may perform a content switching operation to select the second packetized content from the buffer and to send the second packetized content from the buffer, via the interface, to the display device. The use of the buffer by the media interface device may reduce a time of acquisition (e.g., an amount of time to acquire and provide the second packetized content) during the content switching operation. For example, the second packetized content may be available at buffer and available to be provided to the display device. By having the second packetized content available to be provided to the display device, a delay time in presenting the second content at the display device may be reduced as compared to if the media interface device having to acquire the second media content from the second content source, process the received second media content into second packetized content, and send the second packetized content to the display device. Accordingly, the media interface device may switch from sending the first packetized content to sending the second packetized content seamlessly with no detectable delay (or less delay time) from the perspective of a user of the display device.

In a particular illustrative aspect, an apparatus includes a plurality of packetizers, a buffer, and an interface. The plurality of packetizers includes a first packetizer and a second packetizer. Each of the plurality of packetizers is configured to receive media content associated with a corresponding media source. The buffer is coupled to the plurality of packetizers and is configured to concurrently receive first content from the first packetizers and second content from the second packetizers. The interface is configured to provide the first content from the buffer to a display device and, responsive to a media selection request received from the display device, to provide the second content from the buffer to the display device.

In another illustrative aspect, a method includes sending first content associated with a first content source from a buffer of a media interface device to a display device. The method further includes loading second content associated with a second content source into the buffer of the media interface device concurrently with sending the first content from the buffer to the display device. For example, the first content may be acquired from the first content source and the second content may be acquired from the second content source. Each of the acquired first content and the acquired second content may be processed into the same format (e.g., a common format), such as an IP packet format that is supported by the display device, and provided to the buffer. The method also includes receiving, at the media interface device, a media selection request from the display device, the media selection request identifying the second content. The method includes responding to the media selection request by sending the second content from the buffer to the display device.

In another illustrative aspect, a computer readable storage device stores instructions executable by a processor to perform operations including sending a first control signal to cause a selector to provide first content from a buffer of a media interface device to a display device. The operations also include identifying a media selection request included in a message received from the display device. The media selection request identifies second content. The second content and the first content are concurrently buffered at the media interface device by the buffer. For example, the first content may be acquired from the first content source and the second content may be acquired from the second content source. Each of the acquired first content and the acquired second content may be processed into the same format (e.g., a common format), such as an IP packet format that is supported by the display device, and provided to the buffer. The operations further include sending a second control signal to cause the selector to provide the second content from the buffer to the display device.

Referring to FIG. 1, a system 100 is depicted that illustrates an example of a media interface device 102. The media interface device 102 may function as a "universal gateway" that enables access to media content available from various types of content sources, such a first content source 118, a second content source 120, and a third content source 122. Although the media interface device 102 is described as being coupled to three content sources, in other implementations, the media interface device 102 may be coupled to more than three or fewer than three content sources. The media interface device 102 may be coupled to a display device 196 that is configured to execute one or more applications, such as a representative application 198.

The media interface device 102 may include content pipeline circuitry, a control plane 104, a buffer 180, and an interface 182. The content pipeline circuitry may include first content pipeline circuitry 106, second content pipeline circuitry 108, and third content pipeline circuitry 110. Each content pipeline circuitry may be configured to receive media content from a corresponding content source. For example, the first content pipeline circuitry 106 may be configured to receive first media content from the first content source 118, the second content pipeline circuitry 108 may be configured to receive second media content from the second content source, and the third content pipeline circuitry 110 may be configured to receive third media content form the third content source 122. Each of the first content source 118, the second content source 120, and the third content source 122 may include an 8-level vestigial sideband modulation (8VSB) content provider, a satellite digital video broadcasting (DVB) content provider, an internet protocol television (IPTV) content provider or a cable television (CATV) content provider, or a cellular service provider, as illustrative, non-limiting examples. Although the media interface device 102 is described as including content pipeline circuitry for three content sources, in other implementations, the media interface device 102 may include content pipeline circuitry for more than three or fewer than three content sources.

In some implementations, particular content pipeline circuitry may be configured to receive media content via a modem. For example, the media interface device 102 may include a first modem 130, and the second content pipeline circuitry 108 may receive the second media content from the second content source 120 via the first modem 130. As another example, the media interface device 102 may include a second modem 132, and the third content pipeline circuitry 110 may receive the third media content from the third content source 122 via the second modem 132.

Each content pipeline circuit of the plurality of content pipeline circuits may be configured to output content into the same format (e.g., a common format), such as an IP packet format that is supported by the display device 196. For example, particular content pipeline circuitry may be configured to receive media content having a first format and convert the media content to a second format that is output by the particular content pipeline. In some implementations, each of the plurality of content pipeline circuits may provide packetized content to the buffer 180 (e.g., a storage device) of the media interface device 102. To illustrate, the first content pipeline circuitry 106 may be configured to receive the first media content from the first content source 118 and to generate first content (packetized content) based on the first media content. Additionally, the second content pipeline circuitry 108 may be configured receive the second media content from the second content source 120 and to generate second content (packetized content) based on the second media content. Examples of different content pipeline circuits are described further herein with reference to FIG. 4.

In some implementations, the media interface device 102 may have a modular design and be configured to receive pipeline circuitry modules. For example, at least one of the plurality of content pipeline circuits may be a module (e.g., a module card) that includes corresponding pipeline circuitry configured to enable content to be received at the media interface device 102 from a corresponding content source. To illustrate, the first content pipeline circuitry 106 may include a first module and the second content pipeline circuitry 108 may include a second module.

The first content pipeline circuitry 106 may include a first decoder 144 and a first packetizer 146. The first decoder 144 may be configured to decode and/or decrypt the first media content that is received in an encoded format and/or an encrypted format at the first content pipeline circuitry 106. For example, the first decoder 144 may store and manage decryption key(s) provided by a content provider associated with the first content source 118. In some implementations, if the first media content received from the first content source 118 is not encrypted, the first content pipeline circuitry 106 may bypass the first decoder 144 or may not include the first decoder 144. The first packetizer 146 may be configured to packetize the decoded first media content to generate first content (e.g., first packetized content). For example, the first packetizer 146 may insert audio and/or video data from the received first media content into one or more internet protocol (IP) packets. To illustrate, the first packetizer 146 may encapsulate content (e.g., audio data, video data, and or text data) in IP packets for communication between the media interface device 102 and the display device 196. Each IP packet may include an IP packet header portion generated by the first packetizer 146 and a payload portion that includes the content. The first packetizer 146 may send the first packetized audio and/or video data to the buffer 180.

The second content pipeline circuitry 108 may include a second decoder 154 and a second packetizer 156. The second decoder 154 may be configured to decode and/or decrypt the second media content that is received in an encoded format and/or an encrypted format at the second content pipeline circuitry 108 via the first modem 130. For example, the second decoder 154 may store and manage decryption key(s) provided by a content provider associated with the second content source 120. In some implementations, if the second media content received from the second content source 120 is not encrypted, the second content pipeline circuitry 108 may bypass the second decoder 154 or may not include the second decoder 154. The second packetizer 156 may be configured to packetize the decoded second media content to generate second content (e.g., second packetized content). For example, the second packetizer 156 may insert audio and/or video data from the received second media content into one or more IP packets. To illustrate, the second packetizer 156 may encapsulate content (e.g., audio data, video data, and or text data) in IP packets for communication between the media interface device 102 and the display device 196. Each IP packet may include an IP packet header portion generated by the second packetizer 156 and a payload portion that includes the content. The second packetizer 156 may send the second packetized audio and/or video data to the buffer 180.

The first modem 130 may be configured to bypass the second content pipeline circuitry 108 to provide the second media content (and/or messages) from the second content source 120 directly to the buffer 180 (e.g., to support communication between the display device 196 and the second content source 120). In some implementations, the first modem 130 may bypass the second content pipeline circuitry 108 and provide the second media content (and/or message) from the second content source 120 directly to the interface 182.

The third content pipeline circuitry 110 may include a third packetizer 178. The third packetizer 178 may receive packets (e.g., IP packets) from the second modem 132 that is in communication with the third content source 122. The third packetizer 178 may extract the contents of packets (e.g., packets addressed to a public IP address of the media interface device 102) received from the second modem 131 and insert the contents into new packets (e.g., packets addressed to a private IP address of the display device 196 that is in communication with the media interface device 102). The new packets may be sent to the buffer 180.

The buffer 180 (e.g., a storage device) may be coupled to the plurality of content pipeline circuits, such as the first content pipeline circuitry 106, the second content pipeline circuitry 108, and the third content pipeline circuitry 110. In some implementations, the buffer 180 may be directly coupled to the first modem 130. The buffer 180 may be configured to concurrently receive first content (e.g., first packetized content) from the first content pipeline circuitry 106, second content (e.g., second packetized content) from the second content pipeline circuitry 108, third content (e.g., third packetized content) from the third content pipeline circuitry 110, or a combination thereof. In some implementations, the buffer 180 may include multiple sub-buffers, as described with reference to FIGS. 2-3. The buffer 180 and/or each of the multiple sub-buffers may include a first in-first out (FIFO) buffer. The buffer 180 and/or each of the multiple sub-buffers may be sized to store a particular amount of packetized data, such as one megabyte. Although the buffer 180 is described as being distinct from the plurality of content pipeline circuits 106, 108, 110, in other implementations, the buffer may be distributed among the plurality of content pipeline circuits 106, 108, 110. For example, each of the content pipeline circuits 106, 108, 110 may include a corresponding buffer (e.g., a sub-buffer) that is coupled to a packetizer output.

Figure 2:
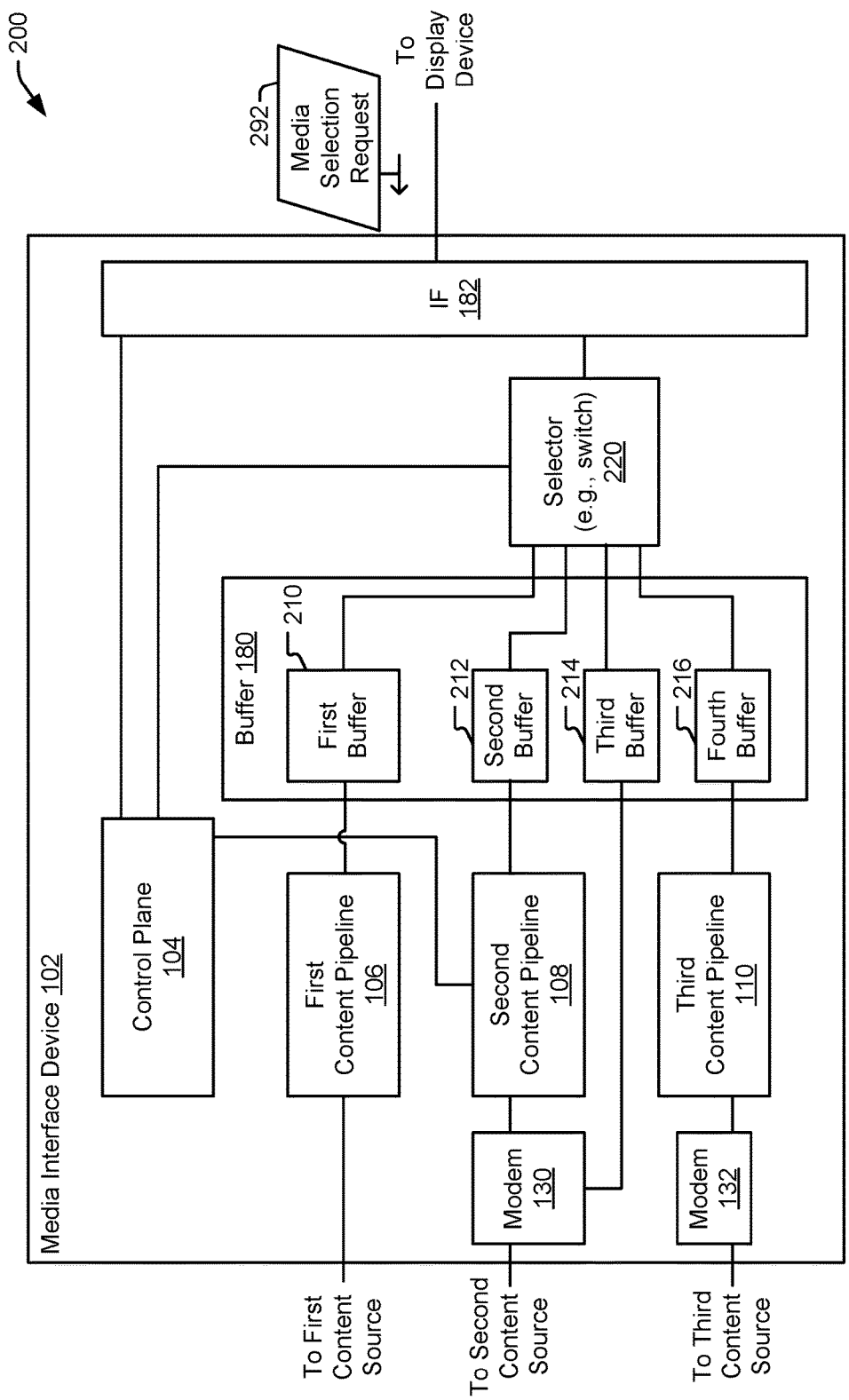
FIG. 2 is a block diagram illustrating another particular example of a media interface device.

In some implementations, the media interface device 102 may include or may be coupled to a selector (not shown), as described further with reference to FIG. 2. The selector (e.g., a switch or a router) may include multiple inputs that are each configured to receive buffered content from the buffer 180. For example, a first input of the multiple inputs may receive the buffered first content associated with the first content source 118 and a second input of the multiple inputs may receive the buffered second content associated with the second content source 120. The selector may select a particular input of the multiple inputs to be provided as an output of the selector. For example, the selector may select the particular input responsive to a control signal (indicating the particular input to be selected) received from the control plane 104. The selector may be included in the buffer 180 or in the interface 182. In other implementations, the selector may be distinct from the buffer 180, the interface, or both.

The interface 182 is coupled to the buffer 180 and configured to support communication with one or more display devices, such as the display device 196. While a single interface 182 is shown, the interface 182 may represent a plurality of interfaces to support communication in accordance with a plurality of communications standards. For example, the interface 182 may include an Ethernet interface, a home phone networking alliance interface (e.g., for communication of IP packets via a coaxial cable connection), a power-line (e.g., Ethernet over power-line) interface, an Institute of Electrical and Electronics Engineers (IEEE) 802.11 interface, or a combination thereof, as illustrative, non-limiting examples. Although the media interface device 102 is described as being coupled to a single display device, in other implementations, the media interface device 102 may be coupled to multiple display devices, as described with reference to FIG. 3.

The interface 182 may be configured to provide data (e.g., content) to the display device 196. For example, the interface 182 may receive packetized content from the buffer 180 and may incorporate the packetized content into a data frame addressed to the display device 196 (e.g., to a media access control (MAC) address of an interface of the display device 196). To illustrate, the interface 182 may be configured to receive a buffered IP packet from the buffer 180 and to generate a MAC header that is combined with the IP packet to generate a data frame. Illustrative, non-limiting examples of data frames that may be communicated between the media interface device 102 and the display device 196 include, but are not limited to, an Ethernet frame, a home phone networking alliance frame, a power-line frame (e.g., Ethernet over power-line frame), an Institute of Electrical and Electronics Engineers (IEEE) 802.11 frame, or another link layer frame. Additionally, the media interface device 102 (e.g., the control plane 104, the first modem 130, etc.) may receive data from the display device 196 via the interface 182.

The control plane 104 may be configured to control operation of the media interface device 102. For example, the control plane 104 may include a processor and a memory storing instructions, such as firmware, that are executable by the processor. The instructions, when executed by the processor, may cause the processor (e.g., the control plane 104) to perform one or more operations described herein with reference to the control plane 104. For example, the control plane 104 may be configured to receive and process messages (e.g., requests) from the display device 196 via the interface 182. The control plane 104 is also configured to control operation of one or more components of the media interface device 102. For example, the control plane 104 is coupled to the first content pipeline circuitry 106, the second content pipeline circuitry 108, the buffer 180, and the interface 182. The control plane 104 may send control signals to the first content pipeline circuitry 106, the second content pipeline circuitry 108, the buffer 180, and the interface 182. For example, the control plane 104 may be configured to send first control signals to the first content pipeline circuitry 106 to activate (e.g., turn on) the first content pipeline circuitry 106, to tune a tuner (or selector) of the first content pipeline circuitry 106 to receive a particular frequency or frequency range, or a combination thereof, as illustrative, non-limiting examples. The control plane 104 may be configured to send second control signals to the second content pipeline circuitry 108 to activate (e.g., turn on) the second content pipeline circuitry 108, to tune a tuner (or selector) of the second content pipeline circuitry 108 to receive a particular frequency or frequency range, or a combination thereof, as illustrative, non-limiting examples. The control plane 104 may send third control signals to the buffer 180, the interface 182, a selector (not shown), or a combination thereof, to cause particular content to be sent to the display device 196 via the interface 182.

The storage device 103 may be a hard drive, a solid state drive, another kind of storage device, or a combination thereof. The storage device 103 may be coupled to the buffer 180, one or more of the content pipeline circuitry, or a combination thereof. The storage device 103 may have a storage capacity that is greater than a storage capacity of the buffer 180. The storage device 103 may be configured to provide storage and retrieval of media content items to enable digital video recorder (DVR) functionality at the media interface device 102) for media content received from multiple types of content sources (e.g., 8VSB, satellite, cable, IPTV, etc.). To illustrate, the storage device 103 may store content received at the media interface device 102 from one of the content sources (e.g., the first content source 118, the second content source 120, or the third content source 122). In an alternative implementation, the storage device 103 may be external to the media interface device 102 (e.g., offsite storage or included in a separate device that is accessible to the media interface device 102).

The display device 196 may be coupled to the media interface device 102 via the interface 182 of the media interface device 102. The display device 196 may be a television, a mobile phone, a laptop computer, a tablet computer, or other device capable of displaying media content, as illustrative non-limiting examples. The display device 196 may receive content (e.g., packetized content including audio data, video data, and/or text data) from the media interface device 102 and may output the content via an interface, such as a display screen, a speaker, a projector, etc. In some implementations, the media interface device 102 may be included (e.g., embedded) in the display device 499, such as a "smart" television, as in illustrative, non-limiting example.

The display device 196 may include at least one processor and a memory. The memory include instructions executable by the processor to perform one or more operations. In some implementations, the processor may execute one or more applications, such as a representative application 198. In some implementations, the application 198 may enable communication with the first content source 118 and a second application may enable communication with the second content source 120.

In some implementations, the display device 196 (e.g., the application 198) may be responsive to a remote control signal received from a remote control device, as described with reference to FIG. 4. For example, the remote control signal may be a media selection signal. Based on the remote control signal, the application 198 (e.g., the processor executing the application 198) may generate a command (or a request) that is communicated to the media interface device 102.

During operation, the control plane 104 may activate the first content pipeline circuitry 106 to receive the first media content from the first content source 118 and may activate the second content pipeline circuitry 108 to receive the second media content from the second content source 120. For example, the control plane 104 may activate the first content pipeline circuitry 106, the second content pipeline circuitry 108, or both, in response to an activation request (for the first media content) received from the display device 196 (e.g., received from the application 198). In some implementations, each of the first content pipeline circuitry 106 and the second content pipeline circuitry 108 is configured to receive corresponding media content via a different communication technology.

The first content pipeline circuitry 106 may receive the first media content and may process the first media content to generate the first content (e.g., first packetized content). The first content pipeline circuitry 106 may provide the first content to the buffer 180. The second content pipeline circuitry 108 may receive the second media content and may process the second media content to generate the second content (e.g., second packetized content). The second content pipeline circuitry 108 may provide the second content to the buffer 180.

The buffer 180 may concurrently receive and store the first content from the first content pipeline circuitry 106 and the second content from the second content pipeline circuitry 108. The interface 182 may receive the first content from the buffer 180 and may provide the first content to the display device as first content 190 (e.g., a first frame that includes the first content).

The media interface device 102 (e.g., the control plane 104) may receive a media selection request 192 from the display device 196 via the interface 182. The interface 182 may extract (e.g., via a de-encapsulation process) request data from the media selection request 192 and may relay the request data to the control plane 104. The media selection request 192 may indicate the second content associated with the second content source 120. The request data may specify pipeline circuitry and a particular media content (e.g., the second media content), a content source (e.g., the second content source 120), a channel (e.g., a television channel), or a combination thereof.

Responsive to the media selection request 192, the media interface device 102 may send the second content to the display device 196 as the second content 194. To illustrate, in response to the media selection request 192, the control plane 104 may send a particular control signal to perform a content switching operation. For example, the control plane 104 may send the particular control signal to the buffer 180 to cause the buffer 180 to output the buffered second content to the interface 182. The use of the buffer 180 by the media interface device 102 may reduce a time of acquisition (e.g., an amount of time to acquire and provide the second content) responsive to the media selection request 192. Accordingly, the media interface device 102 may switch from providing the first content 190 to providing the second content 194 seamlessly with no detectable wait (or less wait time) from the perspective of a user of the display device 196.

In some implementations, the media selection request 192 may request third content associated with the third content source 122. Responsive to the media selection request 192, the media interface device 102 may send the third content from the buffer 180 to the display device 196. For example, the control plane 104 may send a control signal to the buffer 180 to cause the buffer 180 to select the third content and the third content to the display device 196 via the interface 182.

In some implementations, the media interface device 102 may stream media content from a particular source device to the display device 196. For example, the media interface device 102 may stream first media content from the first content source 118 to the display device 196. The first media content streamed to the display device 196 may include or correspond to the first content 190. As another example, the media interface device 102 may stream second media content from the second content source 120 to the display device 196. The second media content streamed to the display device 196 may include the second content 194. The media interface device 102 may switch from streaming the first media content to streaming the second media content responsive to the media selection request 192.

Thus, FIG. 1 illustrates a media interface device 102 that enables an application executing at the display device 196 to access media content received from various types of content sources. The media interface device 102 may be configured to buffer content received from multiple content sources to enable the media interface device 102 to switch from first content received from the first content source 118 to second content received from the second content source 120 with no detectable wait (or less wait time) from the perspective of a user of the display device 196.

Referring to FIG. 2, a system 200 is depicted that illustrates an example of the media interface device 102. The media interface device 102 of the system 200 includes a selector 220 coupled to the buffer 180 and to the interface 182. The selector 220 may be configured to receive a control signal from the control plane 104 as described herein.

The buffer 180 of the media interface device 102 includes multiple buffers 210-216. The multiple buffers may include a first buffer 210, a second buffer 212, a third buffer 214, and a fourth buffer 216. Each buffer of the multiple buffers 210-216 may be configured to receive content, such as content having the same format (e.g., a common format). For example, the first buffer 210 may be configured to receive first content (e.g., a first IP packet) from the first content pipeline circuitry 106 and the second buffer 212 may be configured to receive second content (e.g., a second IP packet) from the second content pipeline circuitry 108. Each of the multiple buffers 210-216 may include a FIFO buffer. Each of the multiple buffers 210-216 may be configured (e.g., sized) to buffer the same amount or a different amount of data.

Although the buffer 102 of FIG. 2 is described as having four buffers, in other implementations, the buffer 102 may include more than four buffers or fewer than four buffers. For example, the multiple buffers 210-216 may not include the third buffer 214. To illustrate, an output of the first modem 130 may be provided directly to an input of the selector 220. Alternatively, an output of the first modem 130 may be provided directly to the interface 182 without being provided to the selector 220 or the buffer 180.

The selector 220, such as a switch or router, may include multiple inputs. Each input of the selector 220 may be configured to receive content. For example, the selector 220 may be configured to receive buffered content from each of the multiple buffers 210-216. To illustrate, the selector 220 may receive the first content from the first buffer 210 and may receive the second content from the second buffer 212. The selector 220 may select particular content received at an input of the selector 220 to be provided as an output of the selector 220. The selector 220 may output particular buffered content. The selector 220 may provide the first content or the second content as an output to the interface 182. In some implementations, the selector 220 may be included in the buffer 180. In other implementations, the selector 220 may be included in the interface 182.

The control plane 104 may be configured to generate a control signal (e.g., a selection signal) and to send the control signal to the selector 220. The control signal may cause the selector 220 to select particular content received at the selector 220 to be provided to the interface 182 as an output of the selector 220.

During operation, the media interface device 102 may receive first media content from the first content source 118 at the first content pipeline circuitry 106. The first content pipeline circuitry 106 may process the first media content to generate first content. The first content pipeline circuitry 106 may provide the first content to the first buffer 210. After buffering the first content, the first buffer 210 may provide the first content to a first input of the selector 220.

The media interface device 102 may receive second media content from the second content source 120 at the second content pipeline circuitry 108. The second content pipeline circuitry 108 may process the second media content to generate second content. The second content pipeline circuitry 108 may provide the second content to the second buffer 212. After buffering the second content, the second buffer 212 may provide the second content to a second input of the selector 220. In some implementations, the selector 220 may concurrently receive the first content from the first buffer 210 and the second content from the second buffer 212.

In a particular implementation, the selector 220 may be configured provide the first content to the interface 182. The interface 182 may send the first content to the display device 196. When the selector 220 is configured to provide the first content to the interface 182, the media interface device 102 may receive a media selection request 292 from the display device 196. For example, the control plane 104 may receive the media selection request 292 via the interface 182. The media selection request 292 may request (e.g., instruct) the media interface device 102 to provide the second content (corresponding to the second content source 120) to the display device 196. Responsive to the media selection request 292, the control plane 104 may generate a control signal to cause the selector 220 to select an input of the buffer 180 that corresponds to the buffered second content from the second buffer 212. The control plane 104 may send the control signal to the selector 220. Responsive to the control signal, the selector 220 may output the second content from the second content pipeline circuitry 108 to the interface 182.

Thus, FIG. 2 illustrates that the media interface device 102 may be configured to buffer content received from multiple content sources to enable a content switching operation. For example, the selector 220 may switch from outputting first content received from the first content source 118 to outputting second content received from the second content source 120 with no detectable wait (or less wait time) from the perspective of a user of the display device 196.

Figure 3:
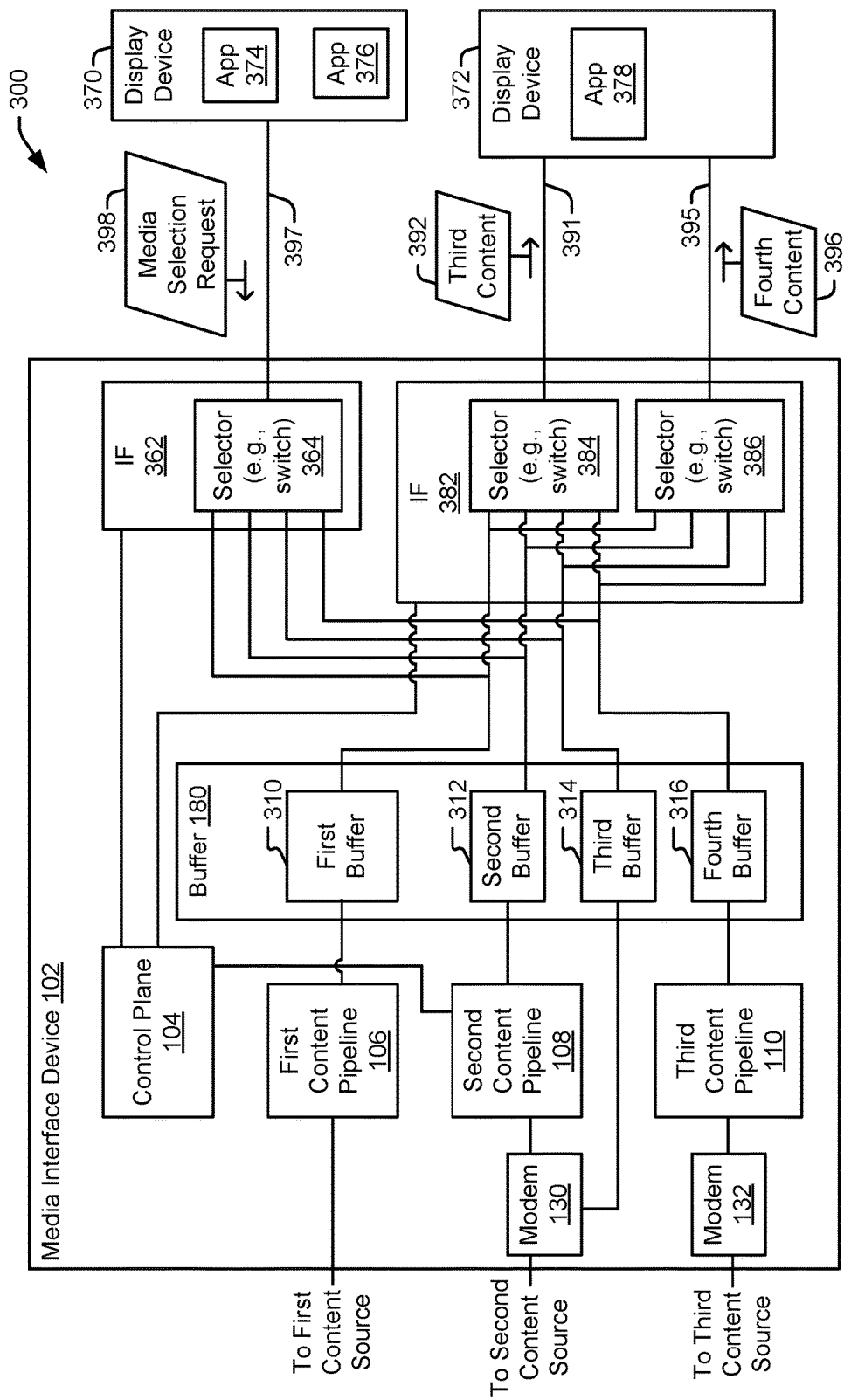
FIG. 3 is a block diagram illustrating another particular example of a media interface device.

Referring to FIG. 3, a system 300 is depicted that illustrates an example of the media interface device 102. The media interface device 102 of the system 300 includes multiple interfaces, such as a first interface 362 and a second interface 382. Each interface of the multiple interfaces 362, 382 may include or correspond to the interface 182 of FIG. 1. The first interface 362 may be configured to support communication with a first display device 370, and the second interface 382 may be configured to support communication with a second display device 372.

The buffer 180 of the media interface device 102 includes multiple buffers 310-316. The multiple buffers may include a first buffer 310, a second buffer 312, a third buffer 314, and a fourth buffer 316. Each buffer of the multiple buffers 310-316 may be configured to receive content, such as content having the same format (e.g., a common format). For example, the first buffer 310 may be configured to receive first content (e.g., a first IP packet) from the first content pipeline circuitry 106, and the second buffer 312 may be configured to receive second content (e.g., a second IP packet) from the second content pipeline circuitry 108. The third buffer 314 may be configured to receive third content from the first modem 130 (e.g., a third IP packet), and the fourth buffer 316 may be configured to receive fourth content from the third content pipeline circuitry 110.

Although the buffer 102 of FIG. 3 is described as having four buffers, in other implementations, the buffer 102 of FIG. 3 may include more than four buffers or fewer than four buffers. For example, the multiple buffers 310-316 may not include the third buffer 314. To illustrate, an output of the first modem 130 may be provided directly to the first interface 362, the second interface 382, or both.

Each of the interfaces 362, 382 may include one or more selectors, such as the selector 220 of FIG. 2. To illustrate, the first interface 362 may include a first selector 364 and the second interface 382 may include a second selector 384 and a third selector 386. Each of the first selector 364, the second selector 384, and the third selector 386 may include or correspond to the selector 220 of FIG. 2. For example, each of the first selector 364, the second selector 384, and the third selector 386 may operate as described with reference to the selector 220 of FIG. 2.

The control plane 104 may be coupled to the first interface 362 and to the second interface 382. The control plane 104 may be configured to generate control signals (e.g., selection signals) to be provided to the first interface 362 to cause the first selector 364 to select one of a first input coupled to the first buffer 310, a second input coupled to the second buffer 312, a third input coupled to the third buffer 314, or a fourth input coupled to the fourth buffer 316. The control plane 104 may also be configured to generate control signals (e.g., selection signals) to be provided to the second interface 382. The control signals provided to the second interface 382 may cause the second selector 384 or the third selector 386 to select a particular selector input.

The first display device 370 may be coupled to the media interface device 102 via a first communication path 397, such as a wired communication path, a wireless communication path, or a combination thereof. The first display device 370 may execute one or more applications, such as a first application 374 and a second application 376. In some implementations, the first application 374 may correspond to the first content source 118 and the second application 376 may correspond to the second content source 120. In some implementations, the first application 374 and the second application 376 may be the same application.

The second display device 372 may be coupled to the media interface device 102 via a second communication path 391 and a third communication path 395. Each of the second communication path 391 and the third communication path 395 may include a wired communication path, a wireless communication path, or a combination thereof. In some implementations, the second communication path 391 and the third communication path 395 may be the same communication path. The second display device 372 may execute one or more applications, such as a third application 378. In some implementations, the third application 378 may correspond to the third content source 122. Although the media interface device 102 is described as being coupled to two display devices, in other implementations, the media interface device 102 may be coupled to a single display device or more than two display devices.

During operation, the first selector 364 may be configured to provide first content from the first buffer 310 to the first display device 370. For example, the first content may be provided to the first application 374. The second selector 384 may be configured to provide third content from the third buffer 314 to the second display device 372 as the third content 392. The third selector 386 may be configured to provide fourth content from the fourth buffer 316 to the second display device 372 as the fourth content 396.

The media interface device 102 may receive a media selection request 398 from the first display device 370 (e.g., from the second application 376). For example, the control plane 104 may receive the media selection request 398 via the first interface 362. The media selection request 398 may request (e.g., instruct) the media interface device 102 to provide the second content (corresponding to the second content source 120) to the first display device 370. Responsive to the media selection request 398, the control plane 104 may generate a control signal to cause the first selector 364 to select a particular input corresponding to the buffered second content from the second buffer 212. The control plane 104 may send the control signal to the first selector 364. Responsive to the control signal, the first selector 364 may select the particular input to be output to the first display device 370 via the first interface 362.

In some implementations, the media interface device 102 may receive a second media selection request (not shown) from the second display device 372 (e.g., from the third application 378). For example, the control plane 104 may receive the second media selection request via the second interface 382. The second media selection request may request (e.g., instruct) the media interface device 102 to provide the second content (corresponding to the second content source 120) to the second display device 372 instead of the fourth content 396. Responsive to the second media selection request, the control plane 104 may identify that the third selector is configured to output the fourth content 396 to the second display device 372. The control plane 104 may generate a second control signal to cause the third selector 386 to select a particular selector input corresponding to the buffered second content from the second buffer 212. The control plane 104 may send the control signal to the first selector 364. Responsive to the second control signal, the third selector 386 may output the second content to the second display device 372 via the second interface 382.

Thus, FIG. 3 illustrates a media interface device 102 that enables multiple display devices to access media content received at the media interface device 102 from various types of content sources. The media interface device 102 may be configured to buffer content received from multiple content sources to enable a content switching operation. For example, the media interface device 102 may switch from first content received from the first content source 118 to second content received from the second content source 120 with no detectable wait (or less wait time) from the perspective of a user of the first display device 370.

Figure 4:
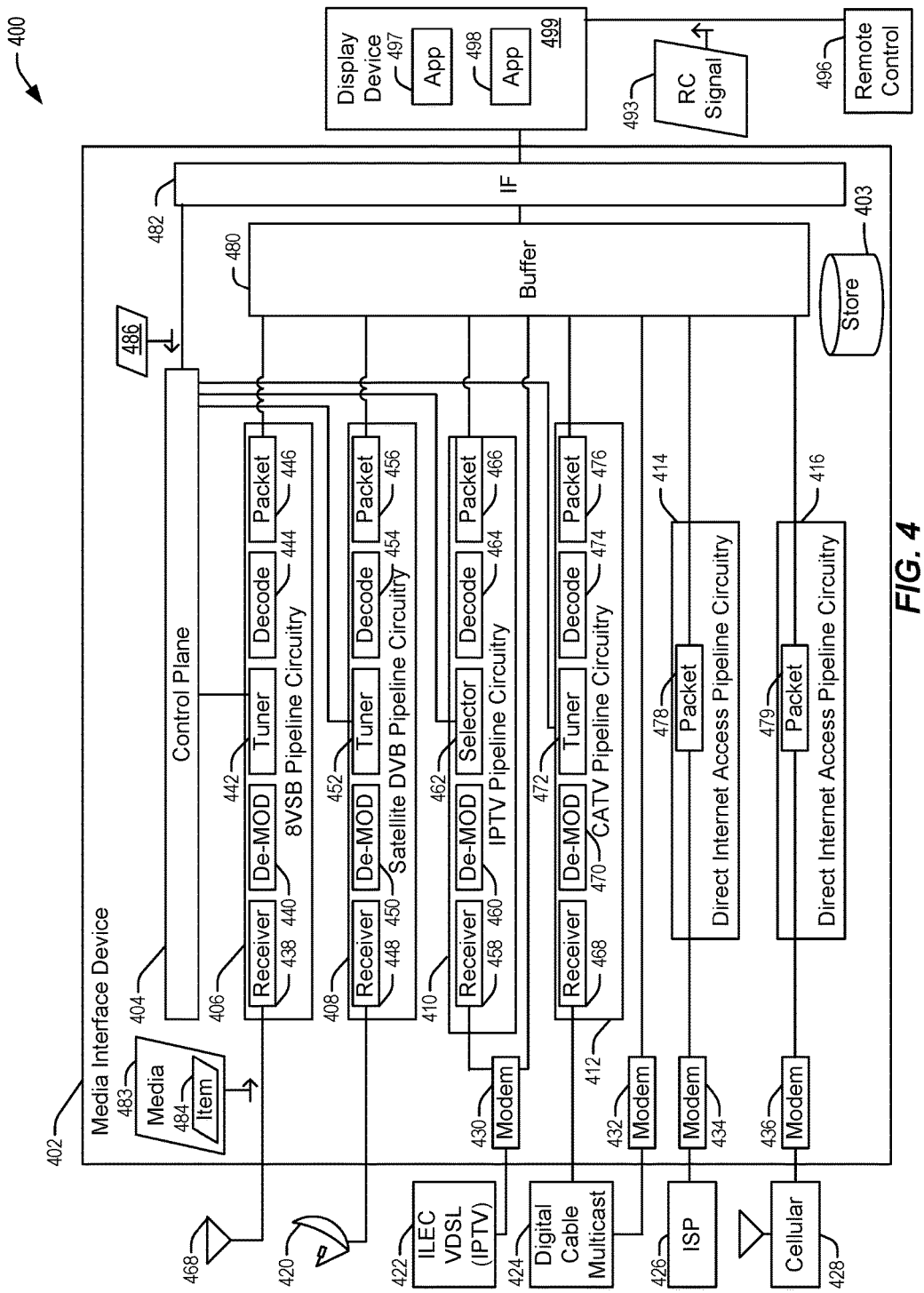
FIG. 4 is a block diagram illustrating another particular example of a media interface device.

FIG. 4 is a block diagram 400 illustrating a particular illustrative example of a media interface device 402. The media interface device 402 may include or correspond to the media interface device 102. The media interface device 402 includes a control plane 404 in communication with content pipeline circuitry 406, 408, 410, 412 (e.g., content pipelines). Each of the content pipeline circuitry 406, 408, 410, 412 may be configured to process media content corresponding to a different communication type (e.g., a satellite type, a cable type, an internet protocol type, DVB type, etc.), as described herein. One or more of the content pipeline circuits 406, 408, 410, 412 may include or correspond to the first content pipeline circuitry 106, the second content pipeline circuitry 108, or the third content pipeline circuitry 110 of FIG. 1.

The control plane 404 may include or correspond to the control plane 104. The control plane 104 may be configured to send control signals to the content pipeline circuitry 406, 408, 410, 412. In the illustrated example, the control plane 404 communicates with 8-level vestigial sideband modulation (8VSB) pipeline circuitry 406, satellite digital video broadcasting (DVB) pipeline circuitry 408, internet protocol television (IPTV) pipeline circuitry 410, and cable television (CATV) pipeline circuitry 412, as illustrative, non-limiting examples. In some examples, the control plane 404 may be in communication with more content pipeline circuits or fewer content pipeline circuits. For example, the control plane 404 may be in communication with multiple content pipeline circuits of the same type (e.g., two different satellite DVB pipeline circuits 408 corresponding to two different satellite television providers, content sources, or satellite transmission technologies).

The media interface device 402 may further include additional content pipeline circuitry 414, 416 not controlled by the control plane 404. In the illustrated example, the media interface device 402 includes first direct internet access pipeline circuitry 414 and second direct internet access pipeline circuitry 416. In alternative implementations, the media interface device 402 may include more or fewer direct internet access pipeline circuits. One or more of the direct internet access pipeline circuits may include or correspond to the first content pipeline circuitry 106, the second content pipeline circuitry 108, or the third content pipeline circuitry 110 of FIG. 1.

The media interface device 102 may further include a buffer 480 and an interface 482. The buffer 480 may include or correspond to the buffer 180 of FIG. 1. The interface 482 may include or correspond to the interface 182 of FIG. 1, the first interface 362, or the second interface 382 of FIG. 3. While a single interface 482 is shown, the interface 482 may represent a plurality of interfaces to support communication in accordance with a plurality of communications standards. To illustrate, the interface 482 may include an Ethernet interface, a home phone network alliance interface (e.g., for communication of IP packets via a coaxial cable connection), a power-line interface (e.g., an Ethernet over power-line interface), an Institute of Electrical and Electronics Engineers (IEEE) 802.11 interface, or a combination thereof, as illustrative, non-limiting examples. The interface 482 may enable communication between components of the media interface device 402 (e.g., the control plane 404 and/or the content pipeline circuits 406, 408, 410, 412, 414, 416) and display devices. Thus, the media interface device 402 may support multiple types of network technologies to communicate with applications executing at display devices (e.g., televisions, mobile phones, laptop computers, tablet computers, or other devices capable of displaying media content). For example, a display device 499 may communicate with the media interface device 402 via a wired Ethernet connection. Additionally or alternatively, the display device 499 may utilize a wireless IEEE 802.11 connection or a power-line connection to communicate with the media interface device 102.

Each of the content pipeline circuits 406, 408, 410, 412, 414, 416 of the media interface device 402 may be configured to receive media content from a corresponding media source. As an illustrative, non-limiting example, the 8VSB pipeline circuitry 406 includes a receiver 438 configured to receive media content (e.g., broadcast television) via an antenna 418. The antenna 418 may receive the media content over-the-air from a terrestrial broadcaster (e.g., a television station). The 8VSB pipeline circuitry 406 further includes a demodulator 440 configured to demodulate the media content received at the receiver 438. The 8VSB pipeline circuitry 406 further includes a tuner 442 configured to tune to particular media content received by the receiver 438. For example, the receiver 438 may receive a plurality of channels and the tuner 442 may be configured to select a particular channel (e.g., a particular frequency or frequency range) of the plurality of channels. The tuner 442 may be responsive to control signals from the control plane 404.

The 8VSB pipeline circuitry 406 further includes a decoder 444. The decoder 444 may be configured to decode the particular media content (e.g., programs of the selected channel). In some implementations, decoders within the media interface device 402, such as the decoder 444, are configured to decrypt media content that is received in an encrypted format. For example, decoders within the media interface device 402 may store and manage decryption key(s) provided by content providers.

The 8VSB pipeline circuitry 406 further includes a packetizer 446. The packetizer 446 is configured to packetize the decoded particular media content. For example, the packetizer 446 may insert audio and/or video data from received media content into one or more internet protocol (IP) packets. The packetizer 446 may send the packetized audio and/or video data to the buffer 180. To illustrate, the media interface device 402 and the display device 499 may be coupled via an IP network (e.g., the display device 499 may have an Ethernet port that is connected to an Ethernet port of the media interface device 402 or the display device 499 may have an IEEE 802.11 wireless network adapter configured to communicate wirelessly with the media interface device 402), and the packetizer 446 may encapsulate media (e.g., audio, video, and or text) content in IP packets for communication between the media interface device 102 and the display device 499. The display device 499 may receive the IP packets and may output the media content based on data included in the IP packets. For example, video content may be output at a display screen and audio content may be output at one or more speakers.

The satellite DVB pipeline circuitry 408 may include a receiver 448 configured to receive media content (e.g., satellite content) from a satellite antenna 420. The satellite antenna 420 may receive the media content over-the-air from a satellite broadcaster. The satellite DVB pipeline circuitry 408 may further include a demodulator 450 configured to demodulate the media content received at the receiver 448, a tuner 452 responsive to the control plane 404 and configured to tune to (e.g., select) particular media content received by the receiver 448, a decoder 454 configured to decode the particular media content (e.g., a selected channel), and a packetizer 456 configured to packetize decoded media content (e.g., into IP packets).

The IPTV pipeline circuitry 410 may include a receiver 458 configured to receive media content (e.g., IPTV content) from a modem 430. The modem 430 may receive the media content via an incumbent local exchange carrier (ILEC) very-high bit-rate digital subscriber line (VDSL) connection 422 to an IPTV provider. In other implementations, a different type of connection may be used to communicate with the IPTV provider. The modem 430 may also communicate directly with other devices (e.g., the display device 499) via the interface 482. To illustrate, an output of the modem 430 may bypass the IPTV pipeline circuitry 410 and may be provided to the interface 482 via the buffer 180. In some implementations, the output of the modem 430 may be provided to the interface 482 and may bypass both the IPTV pipeline circuitry 410 and the buffer 480.

The IPTV pipeline circuitry 410 may further include a demodulator 460 configured to demodulate the media content received at the receiver 458 and an IPTV content selector 462 configured to generate requests for content to be transmitted via the modem 430 to the IPTV provider. It should be noted that the IPTV content selector 462 may operate differently from cable or satellite tuners. For example, instead of tuning to a particular channel or frequency range, the IPTV content selector 462 may request that particular media content (e.g., a particular channel or program) be provided by the IPTV provider to the receiver 458. In an illustrative example, the IPTV content selector 462 generates internet group management protocol (IGMP) requests, such as join requests or leave requests for unicast or multicast communication, as illustrative non-limiting examples.

The IPTV pipeline circuitry 410 further includes a decoder 464 configured to decode media content (e.g., programs of a selected channel) and a packetizer 466 configured to packetize decoded media content. For example, because an IGMP join request for a multicast group is transmitted by the media interface device 402, the IPTV packets received via the multicast group may identify the media interface device 402 as the destination of the IPTV packets. To provide received IPTV content to the display device 499 (and optionally to additional display devices), the decoder 464 may extract audio/video data from the received IPTV packets and the packetizer 466 may packetize the extracted audio/video content into IP packets that are sent to an IP address of the display device 499. Alternatively, the decoder 464 may be bypassed and the packetizer 466 may forward the received IPTV packets to the display device 499, such as by modifying a destination address field of the received IPTV packets.

The CATV pipeline circuitry 412 may include a receiver 468 configured to receive media content (e.g., cable content) from a digital cable multicast connection 424. The digital cable multicast connection 424 may receive the media content from a cable television provider. The CATV pipeline circuitry 412 further includes a demodulator 470 configured to demodulate the media content received at the receiver 468, a tuner 472 responsive to the control plane 404 and configured to tune to particular media content received by the receiver 468, a decoder 474 configured to decode media content (e.g., programs of a selected channel), and a packetizer 476 configured to packetize decoded media content. In the illustrated example, the digital cable multicast connection is further coupled to a modem 432. The modem 432 may transmit content and messages directly to and from the interface 482 (e.g., to support communication between the display device 499 and a cable network). To illustrate, an output of the modem 432 may bypass the IPTV pipeline circuitry 410 and may be provided to the interface 482 via the buffer 180. In some implementations, the output of the modem 430 may be provided to the interface 482 and may bypass both the IPTV pipeline circuitry 410 and the buffer 480.

The 8VSB pipeline circuitry 406, the satellite DVB pipeline circuitry 408, the IPTV pipeline circuitry 410, and the CATV pipeline circuitry 412 may enable receiving and converting media content into a common format (e.g., IP packets) supported by the display device 499. The media interface device 102 may also support bypassing certain format conversion operations in certain scenarios. For example, the media interface device 402 includes direct internet access pipeline circuits 414, 416 that process media content received from certain types of content sources without performing demodulation or decoding. To illustrate, the first direct internet access pipeline circuitry 414 may include a packetizer 478. The packetizer 478 may receive packets (e.g., IP packets) from a modem 434 in communication with an internet service provider (ISP) 426. The packetizer 478 may extract the contents of packets (e.g., packets addressed to a public IP address of the media interface device 402) received from the modem 434 and insert the contents into new packets (e.g., packets addressed to a private IP address of a device in communication with the interface 482). The new packets may be sent to other devices (e.g., the display device 499). To illustrate, new packets may be sent to the display device 499 via the buffer 480 and the interface 482. In some implementations, the new packets may bypass the buffer 480 and may be sent to the display device 499 via the interface 482.

Similarly, the packetizer 478 may receive packets (e.g., packets addressed to a private IP address of the media interface device 402) from the interface 482. The packetizer 478 may extract the contents of packets (e.g., packets addressed to a private IP address of the media interface device 402) received from the interface 482 and insert the contents into new packets (e.g., packets addressed to a public IP address of a device in communication with the ISP 426). The new packets may be sent to the modem 434 to be sent to the ISP 426. In an alternative implementation, the packetizer 478 may change packet headers to redirect packets instead of generating new packets. For example, the packetizer 478 may change a destination address field of a packet to the IP address of the display device 499, thereby causing the interface 482 to forward the packet to the display device 499.

The second direct internet access pipeline circuitry 416 may include a packetizer 479. The packetizer 479 may receive packets (e.g., IP packets) from the modem 436. The modem 436 may be in communication with a cellular service provider 428 that supports communication of IP packets. For example, the cellular service provider 428 may be associated with a third generation (3G) network, a fourth generation (4G) network, a long term evolution (LTE) network, a LTE advanced (LTE-A) network, or another type of network that supports communication of IP packets, as illustrative, non-limiting examples. The packetizer 479 may extract the contents of packets (e.g., packets addressed to a public IP address of the media interface device 402) received from the modem 436 and insert the contents into new packets (e.g., packets addressed to a private IP address of a device in communication with the interface 482). The new packets may be sent to the interface 482 to be sent to other devices (e.g., the display device 499). To illustrate, new packets may be sent to the display device 499 via the buffer 480 and the interface 482. In some implementations, the new packets may bypass the buffer 480 and may be sent to the display device 499 via the interface 482. The packetizer 479 may also process upstream communication packets sent by the display device 499 to the media interface device 402 and may forward content included in such packets to the cellular service provider 428 via the modem 436.

The media interface device 402 further includes a storage device 403. The storage device 403 may be a hard drive, a solid state drive, another kind of storage device, or a combination thereof. The storage device 403 may be configured to store media content items received by the content pipeline circuitry 406, 408, 410, 412. For example, the storage device 403 may provide storage and retrieval of media content items to enable digital video recorder (DVR) functionality at a single device (e.g., the media interface device 402) for media content received from multiple types of content sources (e.g., 8VSB, satellite, cable, IPTV, etc.). In some implementations, a DVR storage device may be external to the media interface device 402 (e.g., offsite storage or included in a separate device that is accessible to the media interface device 402).

In operation, each of the content pipeline circuits 406, 408, 410, 412, 414, 416 may provide content received from a corresponding content provider to the display device 499 that is in communication with the interface 482. For example, each of the content pipeline circuits 406, 408, 410, 412, 414, 416 may provide content received from a corresponding content provider to an application executing at the display device 499. Further, operation of the content pipeline circuits 406, 408, 410, 412 may be controlled by the control plane 404 based on messages received from the display device 499. In the illustrated example, a processor of the display device 499 executes one or more applications, such as an application 497, an application 498, or both. In an alternative implementation, the media interface device 402 may communicate with multiple applications executing at different display devices.

The application 498 may send messages to and receive messages from the interface 482 of the media interface device 402. The application 498 may be responsive to a remote control signal 493 received from a remote control device 491. For example, the remote control signal 493 may be a media selection signal. Based on the remote control signal 493 (e.g., a media selection command), the application 498 may generate a media selection request, such as the media selection request 192 of FIG. 1. The media selection request may identify one of the content pipeline circuits 406, 408, 410, 412 and identify particular media content (e.g., a channel or program). To illustrate, the application 498 may be specific to retrieval of 8VSB content, and may therefore communicate with the 8VSB pipeline circuitry 406 but not with pipeline circuits of the media interface device 402. Alternatively, a single application may be used to receive content from more than one type of pipeline. In this example, the application 498 may determine which content pipeline circuitry type to indicate in the media selection request based on input (e.g., from the remote control device 491), such as when a user of the remote control device 491 selects a particular content provider or content type.

The media selection request may be included in a first communication 486 (e.g., a first IP packet), which may be transmitted to the media interface device 402 from the display device 499. The interface may receive the first communication 486 and provide the first communication to the control plane 404. The control plane 404 may extract the media selection request from the first communication 486. The control plane 404 may determine a type of pipeline circuitry identified by the media selection request, what particular media content item is requested, and what type of action is requested. If a pipeline circuitry type is not identified by the media selection request, the control plane 404 may determine the pipeline circuitry type based on the media content item that is requested (e.g., if the media content item is an over-the-air channel, the control plane 404 may determine that the 8VSB pipeline circuitry 406 is to be used or based on the application). Information regarding the content pipeline circuitry type, the requested media content item, etc. may be included in one or more fields of the media selection request. In the illustrated example, the media selection command 492 identifies the 8VSB module type and a particular media content item 484 and requests that the particular media content item 484 be sent to the application 498. In other examples, the media selection command 492 may request that the particular media content item 484 be stored at the storage device 403 (e.g., a network DVR storage device) in addition to or in the alternative to being sent to the application 498.

The control plane 404 may determine whether content corresponding to the content pipeline circuitry type identified by the media selection request is available to be provided by the media interface device 402. When the content is unavailable (e.g., the media interface device 402 is unable to provide the content), the control plane 404 may send a message to the application 498 via the interface 482 indicating that service is unavailable. For example, content (e.g., the service) may be unavailable if the media interface does not include content pipeline circuitry that includes the content pipeline circuitry type indicated by the media selection request. If the content is available, the control plane 404 may determine whether the content pipeline circuitry having the content pipeline circuitry type is activated. If the content pipeline circuitry is not activated, the control plane 404 may send an activation signal (e.g., a power on signal) to the content pipeline circuitry.

If the content pipeline is activated, the control plane 404 may determine whether the content is being buffered by the buffer 180. If the content is being buffered, the control plane 404 may determine whether the media interface device 402 is configured to provide the buffered content to the display device 499. If the media interface device 402 is not configured to provide the content, the control plane 404 may send one or more control signals to enable the content to be provided from the buffer 480 to the display device 499 via the interface 482. To illustrate, the media interface device 402 (e.g., the buffer 480) may include a selector, such as the selector 220 of FIG. 2, and the control plane 404 may send a control signal to the selector to provide the requested content.

Thus, FIG. 4 illustrates a single media interface device 402 that enables applications executing at display devices to access media content received from various types of content sources, without requiring that the display devices be connected to individual set top boxes or other intermediate devices for each of the content sources. For example, the application 498 may control the operation of the media interface device 402 based on user input received from a remote control device 491 associated with the display device 499. Further, the media interface device 402 may be configured to buffer media content items received from various types of content sources. Responsive to a media selection request, the media interface device 402 may switch from providing first buffered content corresponding to a first content source to providing second buffered content correspond to a second content source with no detectable wait (or less wait time) from the perspective of a user of the display device 499.

Figure 5:
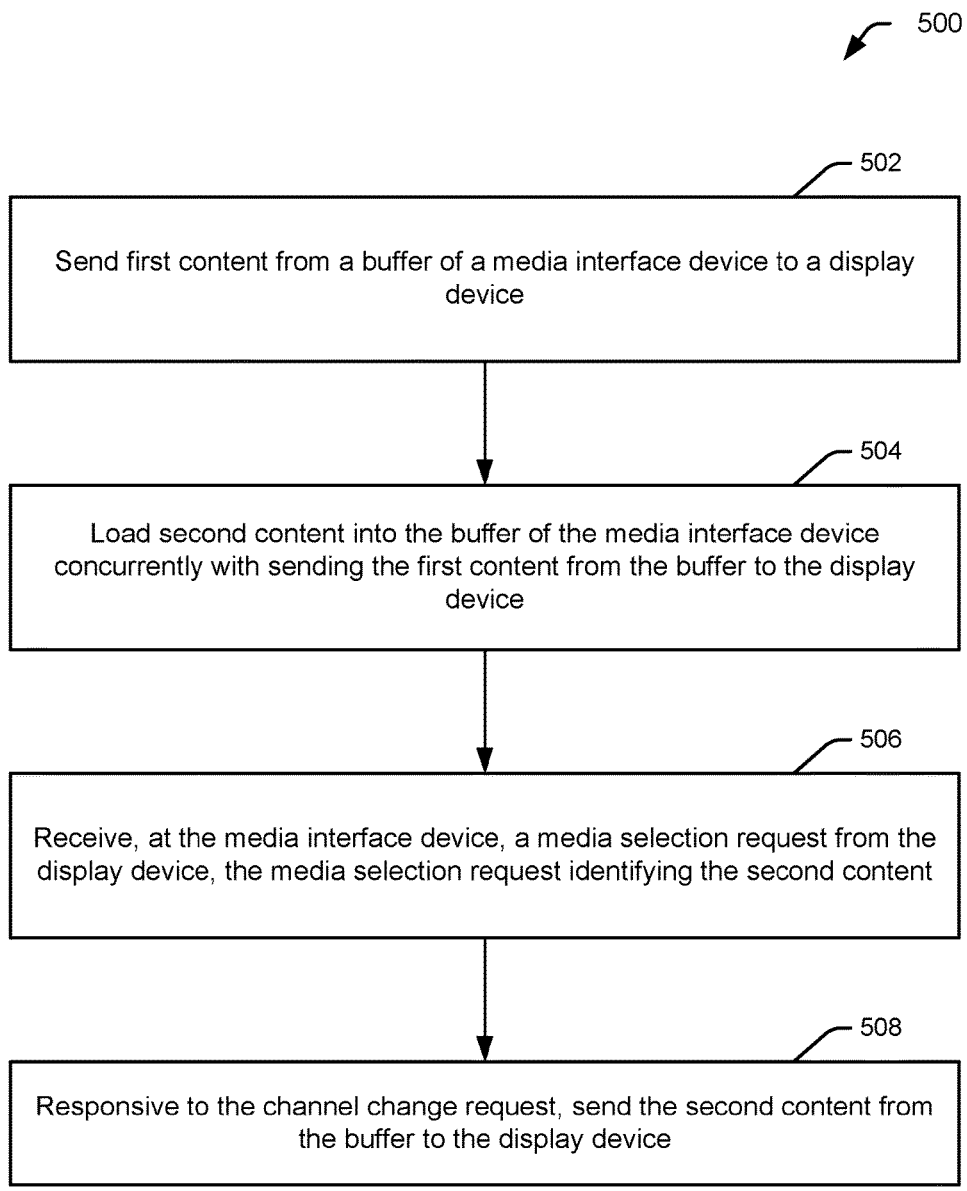
FIG. 5 is a flow diagram that illustrates a particular example of a method for operating a media interface device.

Referring to FIG. 5 a flow diagram that illustrates an example of a method 500 for operating a media interface device is shown. The method 500 may be performed by a media interface device, such as the media interface device 102 of FIGS. 1-3 or the media interface device 402 of FIG. 4.

The method 500 includes sending first content from a buffer of a media interface device to a display device, at 502. For example, the buffer may include or correspond to the buffer 180 of FIG. 1, the first buffer 210, the second buffer 212, the third buffer 214, the fourth buffer 216 of FIG. 2, the first buffer 310, the second buffer 312, the third buffer 314, the fourth buffer 316 of FIG. 3, or the buffer 480 of FIG. 4. In some implementations, the buffer may be partitioned into multiple sub-buffers. At least one of the multiple sub-buffers may be configured to operate as a FIFO. The display device may include the display device 196 of FIG. 1, the first display device 370, the second display device 372 of FIG. 3, or the display device 499 of FIG. 4.

In some implementation, a first control signal may be generated and sent to cause a selector to provide first content from the buffer of the media interface device to the display device. For example, the media interface device may include a control plane, such as the control plane 104 of FIG. 1 or the control plane 404 of FIG. 4, that is configured to generate the first control signal. The selector may include or correspond to the selector 220 of FIG. 2, the first selector 364, the second selector 384, or the third selector 386 of FIG. 3.

The method 500 further includes loading second content into the buffer of the media interface device concurrently with sending the first content from the buffer to the display device, at 504. In some implementations, the first content and the second content may be concurrently stored at the buffer prior to sending the first content to the display device.

The method 500 further includes receiving, at the media interface device, a media selection request from the display device, the media selection request identifying the second content, at 506. The media selection request may include or correspond to the media selection request 192 of FIG. 1, the media selection request 292 of FIG. 2, or the media selection request 398 of FIG. 3. In some implementations, the control plane may identify the second content requested based on the media selection request received from the display device.

The method 500 also includes sending the second content from the buffer to the display device responsive to the media selection request, at 508. In some implementations, a second control signal may be generated and sent to cause the selector to provide the second content from the buffer to the display device. For example, the control plane may be configured to generate the second control signal responsive to the media selection request.

In some implementations, prior to sending first content from a buffer of a media interface device to a display device, the media interface device may receive a first media request from the display device for first media content from the first media source. The first media content may include 8-level vestigial side band content, satellite digital video broadcasting content, internet protocol television content, cable television content, or direct internet access content, as illustrative, non-limiting examples. In response to the first media request, the media interface device (e.g., the control plane) may activate (e.g., power on) a first receiver to enable reception of the first media content. The first media content may include the first content having a first format, such as a cable television format, as an illustrative, non-limiting example. Additionally or alternatively, prior to receiving the media selection request for the second content, the media interface device may receive a second media request from the display device for second media content from the second media source. In response to the second media request, the media interface device (e.g., the control plane) may activate (e.g., power on) a second receiver to enable reception of the second media content. The second media content may include the second content having a second format, such as a satellite digital video broadcasting format, as an illustrative, non-limiting example. The first format and the second format may be the same format or may be different formats.

The media interface device may receive the first content from the first media source and may receive the second content from a second media source. The media interface device may convert the first content from the first format to a third format, such as an IP protocol format, as an illustrative, non-limiting example. The first content having the third format may be provided to the buffer. For example, a packetizer, such as the first packetizer 146, the second packetizer 156, the third packetizer 178 of FIG. 1, the packetizer 446, the packetizer 456, the packetizer 466, the packetizer 475, or the packetizer 478 of FIG. 4, may output the first content having the third format which may be received at the buffer. The media interface device may receive the second content from the second media source and may convert the second content from the second format to the third format. The second content having the third format may be provided to the buffer. The first media content may be the same format or may be different formats.

In some implementations, the media interface device may be coupled to a second display device. The media interface device (e.g., the control plane) may be configured to generate and send a third control signal to cause a second selector to provide the first content from the buffer to the second display device. The media interface device may receive a second media selection request from the second display device that includes a request for third content. The control plane may identify the third content requested based on the second media selection request. In some implementations, the first content, the second content, and the third content may be concurrently buffered at the media interface device. In response to the second media selection request, the media interface device (e.g., the control plane) may generate and send a fourth control signal to cause the second selector to provide the third content from the buffer to the second display device.

Thus, the method 500 illustrates a media interface device that enables the display device to access media content received from various types of content sources. The media interface device may be configured to buffer content received from multiple content sources to enable the media interface device to switch from first content received from the first content source to second content received from the second content source with no detectable wait (or less wait time) from the perspective of a user of the display device.

Figure 6:
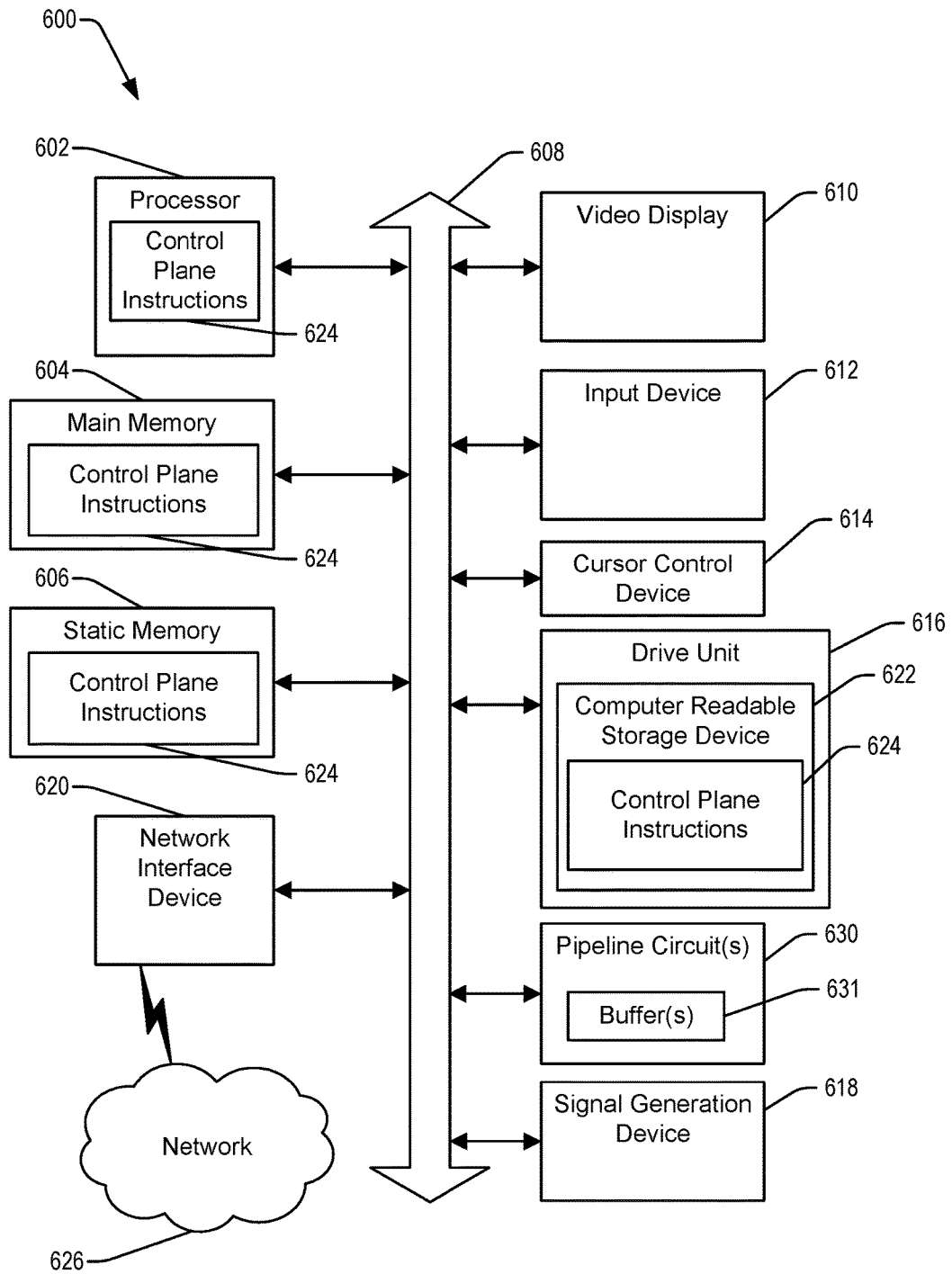
FIG. 6 is a block diagram of an illustrative example of a general computer system.

Referring to FIG. 6, an illustrative example of a general computer system is shown and is designated 600. The computer system 600 includes a set of instructions that can be executed to cause the computer system 600 to perform any one or more of the methods or computer based functions disclosed herein. The computer system 600 may operate as a standalone device or may be connected, e.g., using a network, to other computer systems or peripheral devices. For example, the computer system 600 may include or be included within the media interface device 102 described with reference to FIGS. 1-3 or the media interface device 402 described with reference to FIG. 4.

In a networked deployment, the computer system 600 may operate in the capacity of a server or as a client user computer in a server-client user network environment, or as a peer computer system in a peer-to-peer (or distributed) network environment. The computer system 600 may also be implemented as or incorporated into various devices, such as a monitor, a television, a mobile device, a palmtop computer, a laptop computer, a desktop computer, a communications device, a wireless telephone, a personal computer (PC), a tablet PC, a personal digital assistant (PDA), an endpoint device, a web appliance, or any other machine capable of executing a set of instructions (sequential or otherwise) that specify actions to be taken by that machine. In a particular implementation, the computer system 600 may be implemented using electronic devices that provide video, audio, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 may include a main memory 604 and a static memory 606, which can communicate with each other via a bus 608. As shown, the computer system 600 may further include a video display unit 610, such as a liquid crystal display (LCD), a light emitting diode (LED) display, a touch screen display, a flat panel display, or a solid state display, as illustrative, non-limiting examples. Additionally, the computer system 600 may include an input device 612, such as a remote control device or a keyboard, and a cursor control device 614, such as a mouse. In some implementations, the input device 612 and the cursor control device 614 may be integrated into a single device, such as a capacitive touch screen input device. The computer system 600 may also include a signal generation device 618, such as a speaker, and a network interface device 620. Some computer systems 600 may not include an input device (e.g., a server may not include an input device).

In a particular implementation, as depicted in FIG. 6, the computer system 600 may include computer-readable storage 622 in which one or more sets of instructions 624, e.g. software, can be embedded. The computer-readable storage 622 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 624 may embody one or more of the methods or logic as described herein. The instructions 624 may be executable by the processor 602 to perform one or more functions or methods described herein, such as the method 500 described with reference to FIG. 5. In a particular implementation, the instructions 624 may reside completely, or at least partially, within the main memory 604, the static memory 606, and/or within the processor 602 during execution by the computer system 600. The main memory 604 and the processor 602 also may include a computer-readable storage device.

FIG. 6 illustrates a particular implementation in which the computer system 600 may correspond to a media interface device, and the device may include one or more content pipeline circuits 630, such as one or more content pipeline modules. For example, the content pipeline circuits 630 may correspond to the first content pipeline circuitry 106, the second content pipeline circuitry 108, the third content pipeline circuitry 110 of FIG. 1, or one of the content pipeline circuits 406, 408, 410, 412, 414, 416 of FIG. 4. The content pipeline circuit(s) 630 may include or may be coupled to buffer(s) 861. The buffer(s) 631 may include or correspond to the buffer 180 of FIG. 1, the first buffer 210, the second buffer 212, the third buffer 214, the fourth buffer 216 of FIG. 2, the first buffer 310, the second buffer 312, the third buffer 314, the fourth buffer 316 of FIG. 3, or the buffer 480 of FIG. 4. Although the buffer(s) 631 are described as being included in the content pipeline circuit(s) 630, in other implementations, the buffer(s) 631 may be included in another component, such as the network interface device 620, of the system 600.

In an alternative implementation, dedicated hardware implementations, such as application specific integrated circuits, programmable logic arrays and other hardware devices, may be constructed to implement one or more of the methods described herein. Various implementations may include a variety of electronic and computer systems. One or more implementations described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various aspects of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an illustrative, non-limiting example, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes computer-readable storage 622 that stores instructions 624, so that a device connected to a network 628 may communicate voice, video or data over the network 628. While the computer-readable storage 622 is shown to be a single device, the computer-readable storage 622 may include a single device or multiple devices, such as a centralized or distributed database, and/or associated caches and servers that store one or more sets of instructions. The computer-readable storage 622 is capable of storing a set of instructions for execution by a processor to cause a computer system to perform any one or more of the methods or operations disclosed herein. For example, the computer-readable storage 622 may store instructions for execution by a processor to cause a computer system to perform the method 500 described with reference to FIG. 5.

As another example, the computer-readable storage (e.g., a computer-readable storage device) may stores instructions executable by the processor 602 to perform operations including sending a first control signal to cause a selector to provide first content from the buffer(s) 631 to a display device, such as the video display unit 610 or a display device coupled to the system 600 via the network 626. The operations also include identifying a media selection request included in a message received from the display device. The media selection request identifies second content. The second content and the first content are concurrently buffered (e.g., stored) at the buffer(s) 631. For example, the first content may be acquired from the first content source and the second content may be acquired from the second content source. Each of the acquired first content and the acquired second content may be processed into the same format (e.g., a common format), such as an IP packet format that is supported by the display device, and provided to the buffer(s) 631. The operations further include sending a second control signal to cause the selector to provide the second content from the buffer(s) 631 to the display device.

In a particular illustrative, non-limiting example, the computer-readable storage 622 may include a solid-state memory such as embedded memory (or a memory card or other package that houses one or more non-volatile read-only memories). Further, the computer-readable storage 622 may be a random access memory or other volatile re-writable memory. Additionally, the computer-readable storage 622 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 600 in various implementations.

The illustrations of the aspects described herein are intended to provide a general understanding of the structure of the various aspects. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific aspects have been illustrated and described herein, it should be appreciated that any subsequent arrangement designed to achieve the same or similar purpose may be substituted for the specific implementations shown. This disclosure is intended to cover any and all subsequent adaptations or variations of various aspects and various implementations.

Less than all of the steps or functions described with respect to the exemplary processes or methods can also be performed in one or more of the exemplary implementations. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary implementations can facilitate one or more functions, where the facilitating (e.g., facilitating access or facilitating establishing a connection) can include less than every step needed to perform the function or can include all of the steps needed to perform the function.

In one or more implementations, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more implementation, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single implementation for the purpose of streamlining the disclosure. This disclosure is not to be interpreted as reflecting an intention that the claims require more features than are expressly recited in each claim. Rather, as the following claims reflect, inventive subject matter may be directed to less than all of the features of any of the disclosed implementations. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other aspects, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus comprising:
  a plurality of packetizers comprising a first packetizer, a second packetizer, and a third packetizer, wherein each of the plurality of packetizers is configured to receive media content from a corresponding media source;
  a buffer configured to concurrently receive first content from the first packetizer and second content from the second packetizer; and
  an interface coupled to the buffer and configured to:
    receive a first packet of the first content from the buffer;
    generate a header and a first data frame, wherein the first data frame includes the first packet and the header;
    provide the first data frame to a display device;
    provide the second content from the buffer to the display device responsive to a media selection request received from the display device;
    receive third content from the third packetizer, wherein the third content bypasses the buffer; and
    provide the third content to the display device.

2. The apparatus of claim 1, further comprising:
  first pipeline circuitry configured to receive first media content from a first media source and to generate the first content based on the first media content, wherein the first pipeline circuitry includes the first packetizer; and
  second pipeline circuitry configured to receive second media content from a second media source and to generate the second content, wherein the second pipeline circuitry includes the second packetizer, and wherein the first media source is different from the second media source.

3. The apparatus of claim 2, wherein the first pipeline circuitry further includes a receiver, a demodulator, a tuner, a decoder, or a combination thereof.

4. The apparatus of claim 2, wherein the first media content comprises 8-level vestigial side band content, satellite digital video broadcasting content, internet protocol television content, cable television content, or direct internet access content.

5. The apparatus of claim 1, wherein the interface is further configured to:
  receive a second packet of the second content from the buffer; and
  generate a second header and a second data frame, wherein the second data frame includes the second packet and the second header, wherein the second content is provided via the second data frame to the display device.

6. The apparatus of claim 1, wherein the buffer comprises a first buffer configured to receive the first content and a second buffer configured to receive the second content.

7. The apparatus of claim 6, further comprising a selector coupled to the buffer and to the interface, the selector configured to receive the first content from the first buffer and the second content from the second buffer and to provide an output to the interface.

8. The apparatus of claim 1, wherein the interface is further configured to receive an upstream packet from the display device, wherein the third packetizer is configured to forward the upstream packet to a content source, and wherein the third content is received from the content source.

9. The apparatus of claim 1, wherein the header comprises a media access control header that indicates a media access control address associated with the display device.

10. The apparatus of claim 1, further comprising a control plane coupled to the interface, the control plane configured to receive the media selection request via the interface and to send a control signal to a selector responsive to the media selection request, the control signal configured to cause the selector to output the second content.

11. The apparatus of claim 1, wherein the first packet comprises an Internet Protocol packet, and wherein the first data frame comprises a power-line frame, a home phone network alliance frame, an Ethernet frame, an institute of electrical and electronics engineers 802.11 frame, or a combination thereof.

12. The apparatus of claim 1, further comprising a second interface coupled to the buffer and configured to provide the first content or the second content from the buffer to a second display device.

13. A method comprising:
  concurrently receiving, at a buffer of a media interface device, first content from a first packetizer, second content from a second packetizer, and third content from a third packetizer;

transmitting a first packet of the first content from the buffer to an interface;
initiating generation of a header and a first data frame at the interface, wherein the first data frame includes the first packet and the header;
sending the first data frame from the interface to a display device;
loading the second content into the buffer of the media interface device concurrently with sending the first content from the buffer to the display device;
receiving, at the media interface device, a media selection request from the display device, the media selection request identifying the second content;
sending the second content from the buffer to the display device responsive to the media selection request;
receiving, at the interface, third content from the third packetizer, wherein the third content bypasses the buffer; and
providing the third content to the display device.

14. The method of claim 13, further comprising:
receiving the first content having a first format from a first media source;
receiving the second content having a second format from a second media source;
converting the first content from the first format to a third format;
receiving the first content having the third format at the buffer;
converting the second content from the second format to the third format; and
receiving the second content at the buffer.

15. The method of claim 14, wherein the first format is different from the second format.

16. The method of claim 14, further comprising:
receiving, at the media interface device, a first media request from the display device for first media content from the first media source; and
powering on a first receiver to enable reception of the first media content, the first media content including the first content having the first format.

17. The method of claim 16, further comprising:
receiving, at the media interface device, a second media request from the display device for second media content from the second media source; and
powering on a second receiver to enable reception of the second media content, the second media content including the second content having the second format.

18. A computer readable storage device comprising instructions executable by a processor to perform operations including:
concurrently receiving first content from a first packetizer, second content from a second packetizer, and third content from a third packetizer;
initiating transmission of a first packet of the first content from a buffer to an interface;
generating, at the interface, a header and a first data frame, wherein the first data frame includes the first packet and the header;
initiating transmission of the first data frame from the interface to a display device;
loading the second content concurrently with sending the first content from the buffer to the display device;
receiving, a media selection request from the display device, the media selection request identifying the second content;
sending the second content to the display device responsive to the media selection request;
receiving, at the interface, third content from the third packetizer, wherein the third content bypasses the buffer; and
providing the third content to the display device.

19. The computer readable storage device of claim 18, wherein the operations further include:
receiving the first content having a first format from a first media source;
receiving the second content having a second format from a second media source;
converting the first content from the first format to a third format;
receiving the first content having the third format at the buffer;
converting the second content from the second format to the third format; and
receiving the second content.

20. The computer readable storage device of claim 19, wherein the first format is different from the second format.

* * * * *